Nov. 14, 1967 M. MITTLER ET AL 3,353,074

VARIABLE ELECTRICAL IMPEDANCE DEVICE

Filed Oct. 19, 1965 3 Sheets-Sheet 1

INVENTORS
MARTIN MITTLER
MARTIN BLICKSTEIN
BY
Burgess, Dinklage + Sprung
ATTORNEYS.

Nov. 14, 1967 M. MITTLER ET AL 3,353,074

VARIABLE ELECTRICAL IMPEDANCE DEVICE

Filed Oct. 19, 1965 3 Sheets-Sheet 2

INVENTORS
MARTIN MITTLER
MARTIN BLICKSTEIN

BY Burgess, Dinklage & Sprung

ATTORNEYS.

VARIABLE ELECTRICAL IMPEDANCE DEVICE

Filed Oct. 19, 1965

INVENTORS
MARTIN MITTLER
MARTIN BLICKSTEIN
BY
Burgess, Dinklage & Sprung
ATTORNEYS.

3,353,074
VARIABLE ELECTRICAL IMPEDANCE DEVICE
Martin Mittler, Parsippany, and Martin Blickstein, West Caldwell, N.J., assignors to Voltronics Corporation, Hanover, N.J., a corporation of New Jersey
Filed Oct. 19, 1965, Ser. No. 498,071
10 Claims. (Cl. 317—253)

This invention relates in general to variable electrical impedance devices, and more particularly to electrical impedance devices wherein the magnitude of impedance can be varied as a function of the relative angular positions of a pair of cooperating impedance elements.

In general, rotatable variable impedance devices, such as variable capacitors, inductors, resistors and potentiometers have been known in the electronics art. However, such devices have been limited to the variety wherein one of the impedance elements is fixed with respect to a mounting support, and the other element is rotatable. For example, in the conventional variable capacitor, such as is used for tuning resonant circuits, one group of plates, the stator, is fixed with respect to a mounting support, and the other group of plates, the rotor, is rotatable with respect to the stator. Similarly, in variable resistors and potentiometers, it has been conventional to use a fixed resistance element and a rotatable brush, or arm in contact therewith for controllably varying the resistance between terminals on the resistance element and the brush.

However, with the aforesaid variable impedance devices wherein only one element is rotatable, certain problems arise when it is desired to maintain a precise control over the impedance variation. For example, conventional tuning capacitors with semicircular plates have a capacitance range which is covered by approximately 180 degrees of rotor displacement. Where large dials or knobs are permissible, a fair degree of precision adjustment can be obtained manually. If greater precision is desired, vernier dials and worm wheel drives can be used to turn the rotor element.

In many applications requiring adjustable impedance devices, it is not feasible to provide large knobs, vernier dials, worm drives or other precision adjustment aids, because of space and expense.

The instant invention overcomes the aforesaid disadvantages by providing a variable impedance device wherein each of two cooperating impedance elements are rotatable differentially with respect to a fixed support base in response to the rotation of a single pinion drive shaft. By the use of a differential drive for adjusting the impedance value, through rotation of a pair of impedance elements, a relatively high degree of adjustment precision can be obtained in a compact unit.

In the variable impedance device according to the invention, each of the cooperating impedance establishing elements are mounted to an internal gear ring which meshes with a pinion gear on a common drive shaft. The transmission ratio between one internal gear and pinion set is slightly less than that of the other set, so that for a given rotation of the drive shaft, one impedance element is rotated slightly more than the other. Since the impedance of the device is established by the relative angular positions of the two impedance elements, rather than their absolute angular positions, a high adjustment precision is obtained because of the high ratio between drive shaft angular displacement and the relative angular displacement of the impedance elements. Thus, for example, in a variable capacitor constructed in accordance with the invention, a 180 degree relative displacement of the capacitor plates, which corresponds to the full capacitance range, can be made to correspond to several complete revolutions of the drive shaft. By the choice of an appropriate combination of pinion gear-internal gear ratios, 180 degrees of capacitor plate displacement can be translated into as many as 20 to 30 turns of the drive shaft.

Although the embodiments of the invention described herein relate to capacitors and resistors, it is to be understood that the invention may be applied to other impedance devices, such as inductors and switches.

It is therefore an object of this invention to provide a precision adjustable electrical impedance device which is relatively simple and compact.

Another object of the invention is to provide an adjustable electrical impedance device wherein the magnitude of the impedance can be precisely controlled by rotating a single drive shaft.

Still another and further object of the invention is to provide in the aforesaid impedance device, a precision adjustment mechanism which is integrally constructed with the impedance producing elements therein.

Other and further objects and advantages of the invention will appear in, or become evident from the following detailed description and the accompanying drawings wherein.

Figure 1:
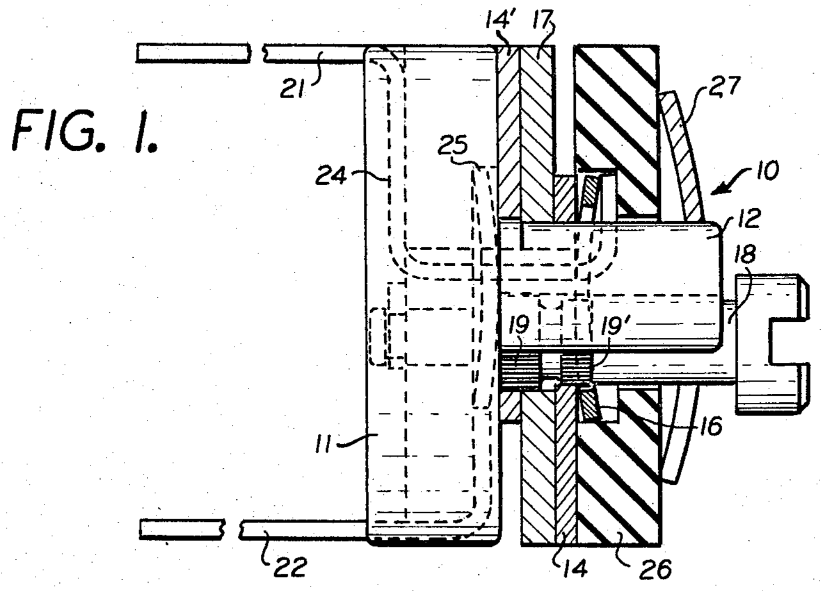
FIG. 1 is a longitudinal cross-sectional view of a two plate variable capacitor constructed in accordance with the invention.
Figure 2:
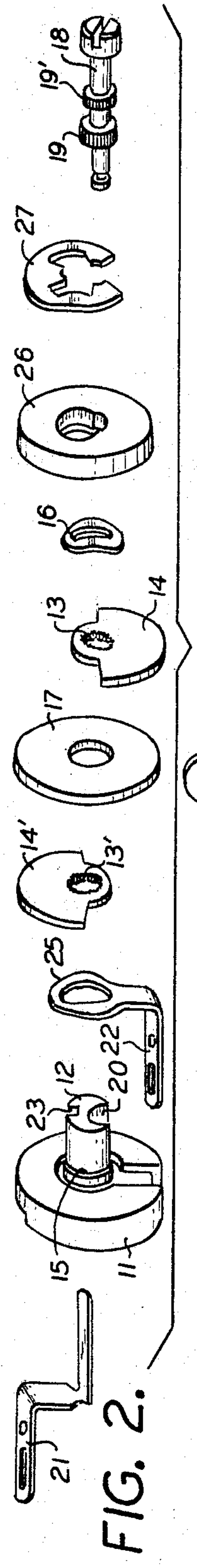
FIG. 2 is an exploded view of the variable capacitor shown in FIG. 1.

Referring now to FIG. 1 and FIG. 2 which show a two-plate variable capacitor 10 having a support base 11 for mounting to a chassis (not shown) or other support structure, and a guide shaft 12 fixedly mounted at one end to the base 11, said guide shaft 12 being generally circular in cross section to accommodate rotatable ring gears 13 and 13' associated with the semicircular capacitor plates 14 and 14' respectively.

As shown by the exploded view of FIG. 2, the ring gears 13 and 13' are made integral with their respective capacitor plates 14 and 14'. It is understood, of course, that this is merely for convenience, and said gears 13 and 13' can be made as separate parts and fastened to the plates 14 and 14' in the assembly of the capacitor 10.

In order to provide for the differential rotation of the plates 14 and 14' as hereinafter described, the ring gears 13 and 13' being internal gears are made with slightly different pitch diameters, for example, the pitch diameter of the gear 13' is less than that of the gear 13. The gears 13 and 13' with their affixed plates 14 and 14' are mounted on the shaft 12 so as to be rotatable thereupon. To accommodate the different internal diameters of the gears 13 and 13', the shaft 12 can be provided with a shoulder step 15, and conventional retaining means, such as a bowed contact washer 16 can be used to maintain the gears 13 and 13' and the plates 14 and 14' in desired axial locations so that the plates 14 and 14' are disposed in a substantially parallel spaced relation to each other, said spacing being established by a dielectric disc 17 disposed on the shaft 12 between the plates 14 and 14', or where it is desired to omit the dielectric disc 17, by any conventional spacing means.

Since it is desired that the plates 14 and 14' cooperate to form an electrical capacitor having a capacitance which can be varied as a function of the relative angular positions of said plates 14 and 14', it is essential that said plates 14 and 14', which of necessity are electrically conductive, be electrically isolated from each other. This can be accomplished in many ways, for example, the plates 14 and 14' may be affixed to gears 13 and 13' which are made of an insulating material such as a plastic, and/or the shaft 12 can be made of plastic.

A pinion shaft 18, having pinion gears 19 and 19' fixedly secured thereto, is disposed through an exterior axial slot 20 provided in the guide shaft 12, said pinion shaft 18 being journaled in the base 11 or supported thereby in any conventional manner so that said shaft 18 is rotatable and the gears 19 and 19' are in meshing engagement with the gears 13 and 13' respectively. The slot 20 as shown is a cylindrical slot, eccentrically positioned with respect to the axis of the guide shaft 12. The use of a cylindrical slot 20 provides for better alignment of the pinion gears 19 and 19' with respect to the gears 13 and 13', similar to the alignment provided for said gears 13 and 13' by the cylindrical guide shaft 12. It is understood, of course, that any suitable shape may be used for the slot 20, if the axis of the pinion shaft 18 is fixedly supported, and the shape chosen for the slot 20 permits the gears 19 and 19' to be rotated in meshing engagement with the gears 13 and 13'.

The gears 19 and 19' and the pinion shaft 18 can be made either integrally, or as separate assemblies, as desired. Since the gears 19 and 19' and the pinion shaft form a mechanical contact path between the gears 13 and 13' which in turn are secured to the plates 14 and 14', the materials selected for the gears 13 and 13', the gears 19 and 19' and the pinion shaft 18 must be such as to preclude the aforesaid mechanical contact path from being also an electrically conductive path in order that the plates 14 and 14' may function as a capacitor.

By reason of the gearing arrangement of the invention the plates 14 and 14' rotate in the same direction, but at slightly different rates in response to the rotation of the pinion shaft 18. For example, when the pinion shaft 18 is turned clockwise through an angle $\theta$, the plates 14 and 14' will be rotated clockwise through angles $\phi_{14}$ and $\phi'_{14}$, respectively. The capacitance $C_0$ established by the plates 14 and 14' depends upon their relative angular displacement $[\phi_{14}-\phi'_{14}]$ and is in general, expressible as the proportion:

$$C_0=K[\phi_{14}-\phi'_{14}]$$

where K is a factor which includes the effect of plate area, spacing, and dielectric constant between plates.

Since the gears 19 and 19' experience the same rotation of the pinion shaft 18, the angles of rotation $\phi_{14}$ and $\phi'_{14}$ of the respective plates 14 and 14' can be readily calculated from the gearing ratios of the gears 19 and 13, and 19' and 13', as follows:

$$\phi_{14}=\left(\frac{D_{19}}{D_{13}}\right)\theta$$

and $$\phi'_{14}=\left(\frac{D'_{19}}{D'_{13}}\right)\theta$$

thus:

$$[\phi_{14}-\phi'_{14}]=\left[\left(\frac{D_{19}}{D_{13}}\right)-\left(\frac{D'_{19}}{D'_{13}}\right)\right]\theta$$

where $D_{19}$, $D'_{19}$, $D_{13}$ and $D'_{13}$ are the pitch diameters of the respective gears 19, 19', 13 and 13'.

From the foregoing it is apparent that $[\phi_{14}-\phi'_{14}]$, the relative capacitor plate displacement is but a small fraction of the pinion shaft 18 rotation, $\theta$. For example, a ratio of 1:4 for $(D_{19}/D_{13})$ and a ratio of 1:5 for $(D'_{19}/D'_{13})$ provides a ratio of 1:20 between $[\phi_{14}-\phi'_{14}]$ and $\theta$. Consequently, for a pair of semicircular capacitor plates 14 and 14', which have a 180 degree capacitance range, the aforesaid gear ratios 1:4 and 1:5 will permit this range to be spread out over 10 full revolutions of the pinion shaft 18. By choosing even closer ratios of $(D_{19}/D_{13})$ and $(D'_{19}/D'_{13})$ such as 1:4.0 and 1:4.2, respectively, an even greater $[\phi_{14}-\phi'_{14}]$ and $\theta$ ratio, 1:84, can be obtained.

In order that the capacitance established by the plates 14 and 14' may be utilized in an external circuit (not shown) electrical terminals 21 and 22, conductively connected to the plates 14 and 14', respectively, are provided. The terminal 21 passes through a slot 23 in the guide shaft 12 and is bent into abutting contact with the bowed washer 16 which is in electrical contact with the plate 14. For connection to the aforesaid external circuit, the terminal 21 extends through the guide shaft 12 and out through the support base 11. For convenience, and as an aid in holding the assembled capacitor 10 together, the terminal 21 may be bent into a Z form as at 24.

The terminal 22 is provided with an integral bowed washer 25 which is disposed on the guide shaft 12 so as to be in electrical contact with the plate 14'. For connection to an external circuit, the terminal 22 is extended out through the support base 11.

A cover 26, which can be made of plastic, is slipped on to the shaft 12 and locked in place by a retaining ring 27, so as to hold the assembled capacitor 10 together.

Since the particular arrangement of the terminals 21 and 22 and the cover 26 and its retaining ring 27 as shown in FIG. 1 and FIG. 2 is merely an illustrative example, it is to be understood that other suitable conventional arrangements and variations thereof can be used. As to preferred materials for the terminals 21, 22, the cover 26, and retaining ring 27, any suitable materials may be used, insofar as they permit the plates 14 and 14' to be conductively connected to an external circuit without short circuit.

Figure 3:
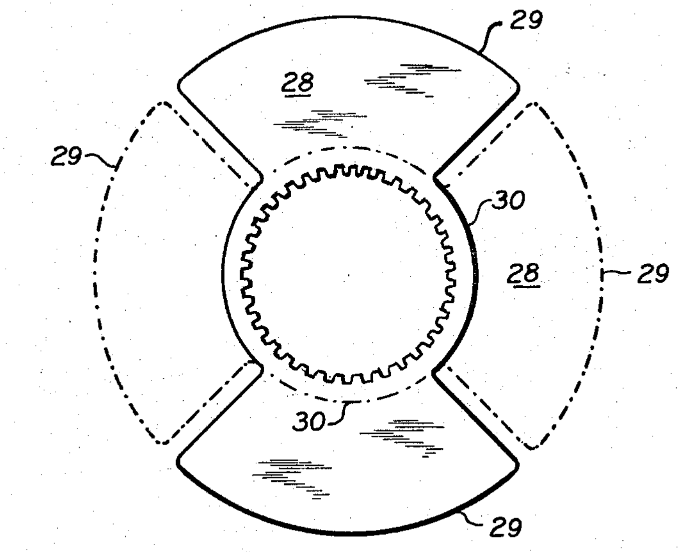
FIG. 3 is a typical normal view of a two-leaf butterfly configuration capacitor plate which can be substituted for the semicircular type capacitor plates in the invention.

In the capacitor embodiment of the invention, the plates 14 and 14' are not necessarily limited to a semicircular shape, and other plate configurations, such as the two-leaf butterfly type shown in FIG. 3, can be used. The two-leaf butterfly plates 28 and 28' are substantially two 90 degree circular sector leaves 29 extending from an integral platering 30, said leaves 29 being oppositely disposed.

The use of the butterfly capacitor plates 28 and 28' in the variable capacitor of the invention provides a capacitance range which is covered by approximately 90 degrees of relative plate rotation instead of the 180 degrees associated with the semicircular plates 14 and 14'.

Figure 5:
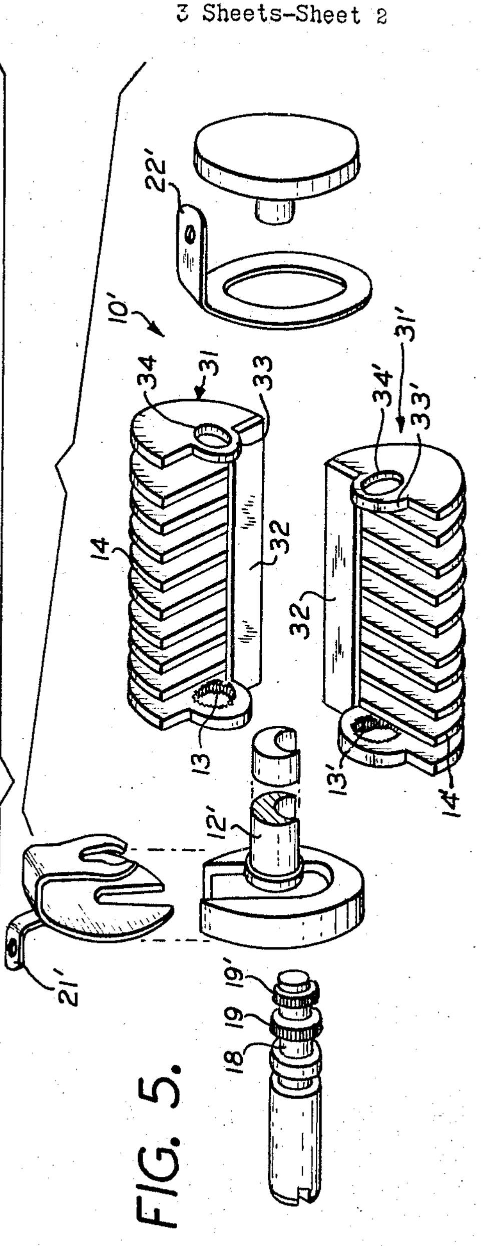
FIG. 5 is an exploded view of the variable capacitor of FIG. 4.
Figures 4, 6:
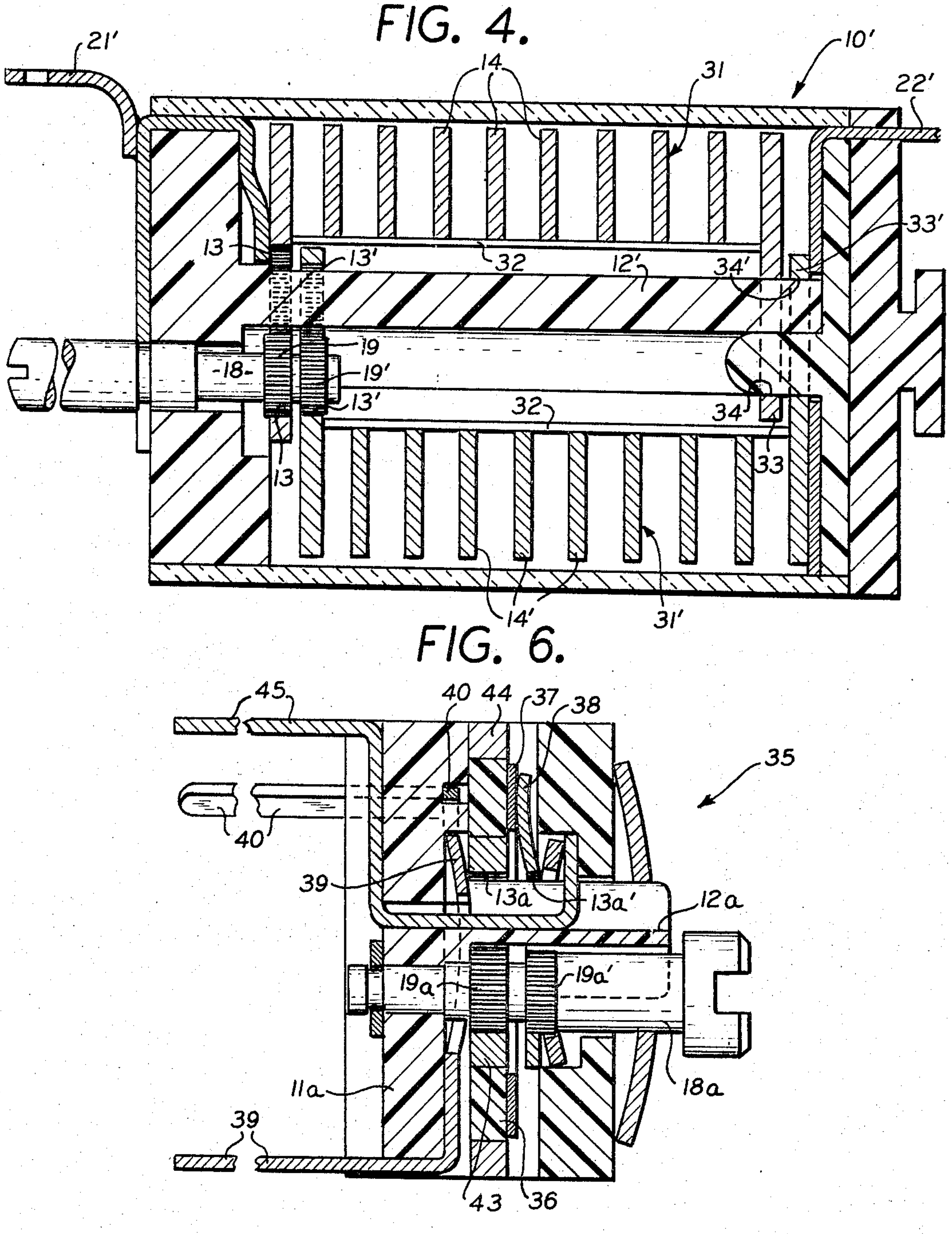
FIG. 4 is a longitudinal cross-sectional view of a multiple plate variable capacitor constructed in accordance with the invention.
FIG. 6 is a longitudinal cross-sectional view of a potentiometer constructed in accordance with the invention.

As is indicated by FIG. 4 and FIG. 5, the variable capacitor embodiment of the invention is not limited to two-plate capacitors, and the differential drive arrangement in accordance with the invention may be extended to multiple plate capacitors such as the multi-plate variable capacitor 10' shown therein. The variable capacitor 10', as shown more clearly by the exploded view of FIG. 5, has a plurality of plates 14 and 14', arranged in two arrays 31 and 31'. One array, 31, is composed of a plurality of plates 14, said plates 14 being disposed in substantially parallel spaced relation to each other, and are electrically connected together. One of the plates 14 is secured to an internal gear ring 13 in a manner similar to the two-plate capacitor 10. A spacer support bar 32 maintains the proper spacing between the plates 14 and constrains them to rotate in unison with the gear 13, which is rotatably mounted on the guide shaft 12' as in the two-plate capacitor 10.

The other array 31' of plates 14' is constructed similarly to the first array 31, one of the plates 14' on said array 31 being secured to a second internal gear ring 13' of lesser pitch diameter than the first gear ring 13, which is also rotatably mounted on the guide shaft 12'. To maintain better alignment of the arrays 31 and 31', it is preferable that their respective gear rings 13 and 13' be secured to the end plates 14 and 14' of said arrays 31 and 31' and that support rings 33 and 33' rotatably mounted on the guide shaft 12' be secured to opposite end plates 14 and 14'. The support rings 33 and 33' are similar to the gear rings 13 and 13' in that they provide rotatable support means for the plates 14 and 14', but differ in that they have cylindrical bores 34 and 34' respectively rather than gear teeth, the diameters of said bores 34 and 34' being such as to provide a sliding fit with the guide shaft 12'.

Of necessity, the guide shaft 12' is longer than the guide shaft 12 used with the two-plate capacitor 10, said guide shaft 12' extending axially to rotatably support the gear rings 13, 13' and the support rings 33, 33'.

One the guide shaft 12', the arrays 31 and 31' are axially disposed in relation to each other so that the plates 14 of the array 31 can mesh with the spaces between the plates 14' on the array 31' when said arrays 31 and 31' are rotated together.

As in the two-plate capacitor 10, the arrays 31 and 31' cooperate to form a multi-plate electrical capacitor 10' having a capacitance which is a function of the relative angular positions of said arrays 31 and 31'. Similarly, electrical terminals 21' and 22' are conductively connected to the plates 14 and 14' of the respective arrays 31 and 31' so as to provide for connecting the capacitor 10' to an external circuit (not shown).

The spacer support bars 32 must be so constructed that all the plates 14 on the array 31 are electrically connected together, and all the plates 14' on the array 31' are likewise electrically connected, and that when the arrays 31 and 31' are rotated and the support bars 32 contact each other or the plates of the other array, either 31 or 31', there is no short circuiting. This can be readily accomplished by using conductive support bars 32 which are electrically bonded to each of their associated plates 14 or 14', and are coated with insulation on the remaining portion of their exterior surfaces.

With the exception of the multi-plate feature provided by the arrays 31 and 31', the construction and operation of the capacitor 10' is similar to that of the two-plate capacitor 10.

Figure 7:
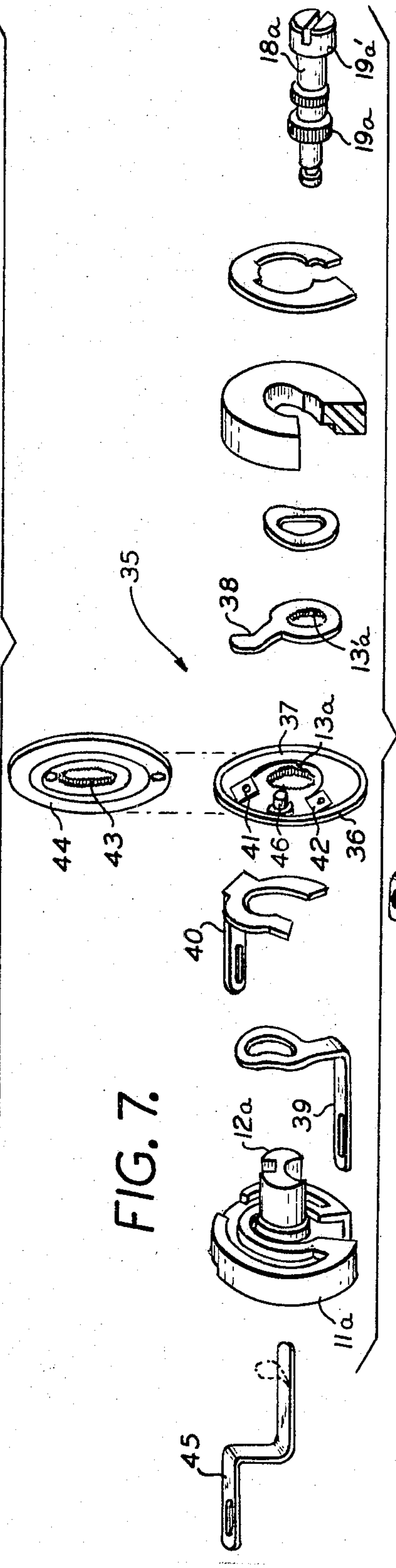
FIG. 7 is an exploded view of the potentiometer of FIG. 6.

Although the foregoing description has been directed toward capacitive impedance embodiments of the invention, as shown by FIG. 6 and FIG. 7, the invention is also adaptable to resistive impedance embodiments.

FIGS. 6 and 7 show a resistive potentiometer 35, which can also be utilized as a variable resistor, which has a support base **11*a*, a guide shaft 12*a*, internal gear rings 13*a* and 13*a'*, and a pinion shaft 18*a* with gears 19*a* and 19*a'* similar to those provided in the two-plate capacitor 10. A resistance element support ring 36 having a resistance element 37 secured thereto replaces the plate 14 of the capacitor 10 embodiment. A conductive brush 38 secured to the gear ring 13*a'* replaces the plate 14' of the aforesaid capacitor 10**.

The resistive element 37 is fixedly mounted to the support ring 36, which is in turn secured to the gear ring **13*a* so as to be rotatable therewith. Electrical connection means 39 and 40 are conductively connected to the respective terminal ends 41 and 42 of the resistance element 37, for connecting same to an external circuit (not shown). A pair of concentrically disposed conductive rings 43 and 44 affixed to the resistance element support ring 36, the inner ring 43 being conductively connected to the terminal end 41, and the outer ring 44 being conductively connected to the terminal end 42 are in wiping contact with the connection means 39 and 40 respectively, thereby providing the aforesaid conductive connection of the resistance element 37 to an external circuit. It is understood, however, that other suitable means for connecting the rotatable resistance element 37** to an external circuit can be substituted.

The conductive brush 38 which is fixedly secured to the internal gear ring **13*a'*, which in turn is rotatably mounted on the guide shaft 12*a*, is disposed thereupon so as to be in wiping contact with said resistance element 37. The brush 38, which serves as the arm of the potentiometer 35, is conductively connected to an external circuit by an electrical connection means 45 similar to the terminal 21 in the capacitor 10. A post 46 fixedly secured to the support ring 36 confines the travel of the brush 38 between the terminal ends 41 and 42 of the resistance element 37**.

The potentiometer 35 operates in a manner mechanically similar to the capacitor 10 in that the rotation of the pinion shaft **18*a* drives the resistance element 37 and the brush 38 at a differential relative rate of rotation thereby enabling the resistance between the terminals 41, 42 and said brush 38 to be varied between maximum and minimum limits as a function of the relative angular positions of the brush 38 and resistance element 37**.

If desired, the support ring 36 and the gear ring **13*a* may be integral and made of an electrical insulating material, such as plastic, and likewise, the brush 38 and gear ring 13*a'*** may be integral, but made of an electrically conductive material such as metal.

It should be noted that by substituting an inductance, such as a wire coil (not shown) for the resistance element 37, the potentiometer 35 can be converted into a variable inductor, or an autotransformer. Thus the instant invention can be applied to controllably vary each of the three types of impedance, capacitance, resistance and inductance.

What is claimed is:

1. A variable capacitor which comprises:

(a) A support base;

(b) A guide shaft fixedly mounted at one end to said support base, said guide shaft being circular in cross-section and having an axial exterior slot;

(c) A first internal gear ring rotatably mounted on said guide shaft;

(d) A first capacitor plate secured to said first internal gear ring;

(e) A second internal gear ring of lesser pitch diameter than the first rotatably mounted on said guide shaft;

(f) A second capacitor plate secured to said second internal gear ring, said second capacitor plate being disposed in substantially parallel spaced relation to the first plate and cooperating therewith to form an electrical capacitor having a capacitance which is a function of the relative angular positions of said first and second capacitor plates;

(g) An electrical terminal conductively connected to said first capacitor plate;

(h) An electrical terminal conductively connected to said second capacitor plate;

(i) A pinion shaft disposed through the axial slot in the guide shaft, said pinion shaft having a first pinion gear which engages said first internal gear ring and a second pinion gear which engages said second internal gear ring, said first and second pinion gears being fixedly secured to the pinion shaft; and, (j) Means for supporting said pinion shaft so that it is rotatable about its longitudinal axis and its first and second pinion gears are maintained in meshing engagement with the first and second internal gear ring respectively, whereby when said pinion shaft is rotated, the first and second capacitor plates are driven at a differential relative rate of rotation thereby permitting the capacitance established by said plates to be controllably varied from a maximum to a minimum value.

2. The variable capacitor of claim 1 wherein a dielectric disc is disposed between the first and second capacitor plates.

3. The variable capacitor of claim 1 wherein the first and second capacitor plates are each substantially semicircular.

4. The variable capacitor of claim 1 wherein the first and second capacitor plates are of the two-leaf butterfly configuration type, with each plate leaf being substantially a 90 degree circular sector and the leaves on each plate being oppositely disposed.

5. The variable capacitor of claim 4 wherein a dielectric disc is disposed between the first and second capacitor plates.

6. The variable capacitor of claim 1 wherein the first and second capacitor plates and the first and second internal gear rings are respectively integral.

7. A variable capacitor which comprises:

(a) A support base;

(b) A guide shaft fixedly mounted to said support base, said guide shaft being circular in cross-section and having an axial exterior slot;

(c) A first internal gear ring rotatably mounted on said guide shaft;

(d) A first array of capacitor plates secured to said first internal gear ring, said array comprising a plurality of semicircular capacitor plates electrically connected together and disposed in substantially parallel spaced relation to each other, and constrained so as to rotate in unison in response to rotation of said first internal gear ring;

(e) A second internal gear ring of lesser pitch diameter than the first rotatably mounted on said guide shaft;

(f) A second array of capacitor plates similar to the first, said second array being secured to said second internal gear ring so as to be rotatable therewith, and said second array being disposed in relation to the first array so that the plates of said second array can mesh with the spaces between the plates of the first array when said first and second arrays are rotated together, said second array cooperating with the first to form a multi-plate electrical capacitor having a capacitance which is a function of the relative angular positions of said first and second capacitor plate arrays;

(g) An electrical terminal conductively connected to said first array of capacitor plates;

(h) An electrical terminal conductively connected to said second array of capacitor plates;

(i) A pinion shaft disposed through the axial slot in the guide shaft, said pinion shaft having a first pinion gear which engages the first internal gear ring and a second pinion gear which engages the second internal gear ring, said first and second pinion gears being fixedly secured to the pinion shaft; and, (j) Means for supporting said pinion shaft so that it is rotatable about its longitudinal axis and its first and second pinion gears are maintained in meshing engagement with the first and second internal gear rings respectively, whereby when said pinion shaft is rotated, the first and second capacitor plate arrays are driven at a differential relative rate of rotation thereby permitting the capacitance established by said plates to be controllably varied from a maximum to a minimum value.

8. The variable capacitor of claim 7 wherein the first internal gear ring is integral with one of the plates in the first array of capacitor plates, and the second internal gear ring is integral with one of the plates in the second array.

9. A variable electrical impedance device which comprises a base means, a first element and a second element, both supported by said base means and disposed for rotation relative thereto and for cooperation with each other to establish an electrical impedance the magnitude of which is a function of their relative angular positions, and differential rotary gear drive means including a pair of internal ring gears, one connected to each of said first and second impedance establishing elements, and a pair of pinion gears each disposed for meshing engagement with a corresponding ring gear and mounted on a common drive shaft for rotation therewith to rotate said ring gears and their respective impedance establishing elements in a common direction with respect to the base means and through respective angular displacements differing from each other by an amount corresponding to the magnitude of the drive shaft rotation to selectively vary the relative angular positions of said elements, and hence the magnitude of the electrical impedance established thereby.

10. The variable electrical impedance device according to claim 9 wherein said first and second impedance establishing elements each include electrically conductive parts constituting at least one capacitor plate, and said impedance establishing elements are disposed in electrically insulated relation to each other to define a capacitor the capacitance value of which is selectively variable by said drive means.

References Cited

UNITED STATES PATENTS

| | | | |
|---|---|---|---|
| 1,610,258 | 12/1926 | Chapman | 317—253 |
| 1,643,782 | 10/1927 | Loewe | 317—253 X |
| 1,738,195 | 12/1929 | Ornstein | 317—253 |
| 1,977,289 | 10/1934 | Scofield | 317—253 X |
| 3,217,216 | 11/1965 | Dotto | 317—255 X |

LEWIS H. MYERS, *Primary Examiner.*

E. A. GOLDBERG, *Assistant Examiner.*